United States Patent
Roesner

(10) Patent No.: US 6,265,976 B1
(45) Date of Patent: Jul. 24, 2001

(54) METHOD AND APPARATUS FOR PROVIDING RECEIVER DUAL CHANNEL COUPLING IN A READER FOR RFID TAGS

(75) Inventor: Bruce B. Roesner, San Diego, CA (US)

(73) Assignee: Single Chip Systems Corporation, San Diego, CA (US)

( * ) Notice: Subject to any disclaimer, the term of this patent is extended or adjusted under 35 U.S.C. 154(b) by 0 days.

(21) Appl. No.: 09/602,233

(22) Filed: Jun. 23, 2000

(51) Int. Cl.[7] ..................................................... G08B 13/14
(52) U.S. Cl. ................... 340/572.4; 340/10.1; 340/10.3; 340/572.2; 455/132
(58) Field of Search ............................ 340/572.4, 572.1, 340/572.2, 10.1, 10.2, 10.3, 10.4; 455/41, 132, 137, 138; 342/44, 51

(56) References Cited

U.S. PATENT DOCUMENTS

| | | | |
|---|---|---|---|
| 3,863,244 | * 1/1975 | Lichtblau | 340/280 |
| 3,986,124 | * 10/1976 | Mitchell, Jr. | 325/305 |
| 4,748,642 | * 5/1988 | Bertsche | 375/94 |
| 4,812,822 | * 3/1989 | Feltz et al. | 340/572 |
| 5,549,658 | * 8/1996 | Shannon et al. | 607/57 |

* cited by examiner

Primary Examiner—Jeffery Hofsass
Assistant Examiner—Phung Nguyen
(74) Attorney, Agent, or Firm—Daniel L. Dawes, Esq.; Myers, Dawes & Andras LLP

(57) ABSTRACT

The invention reduces recovery time in a receiving coil or antenna of an RFID reader by generating a reference voltage that then clamps the node on which the desired signal is monitored. The coil is coupled to parallel channels. One channel has a recovery time or capacitance very much less than the other parallel channel. The two channels have a monitored node which are clamped together or at least close together by means of a Schottky diode. The monitored nodes of both channels are coupled to the inputs of a differential amplifier. The output of the amplifier is the conditioned received signal from the coil used in the reader as the sensed signals from the RFID tags.

20 Claims, 1 Drawing Sheet

METHOD AND APPARATUS FOR PROVIDING RECEIVER DUAL CHANNEL COUPLING IN A READER FOR RFID TAGS

BACKGROUND OF THE INVENTION

1. Field of the Invention

The invention relates to the field of radio frequency identification circuits and methodologies.

2. Description of the Prior Art

The antenna of an RFID reader used in transmitting a carrier signal to an RFID tag is operated in a tuned fashion. The antenna, or coil for low frequency inductively coupled systems, is typically operated in such a fashion that the voltage on the coil (and subsequently its magnetic field) is very uniform. The uniformity is important because any fluctuation in the transmitting coil when used as a receiving coil would be detected as a signal from a tag. Even when using a separate receiving coil, it is coupled with the transmitting coil such that slight deviations by the transmitting coil cause amplitude modulation or ON/OFF keying in the receiving coil which are again sensed by the receiving coil as a signal.

With more state-of-the-art RFID systems, the reader communicates with the tag by altering the amplitude of its transmitted signal. In other words, the transmitting coil is changed from a high voltage to a lower voltage and in most cases is usually turned completely off in rapid succession. With a large voltage change to the tuned transmitted coil the recovery time is quite long. Unfortunately, it is typically during this recovery period that a backscattered (or mutually inducted for low frequency H field operation) signal from a tag is sensed. It is important that the change in the voltage on the sensing coil in the reader of RFID tags be kept to a minimum so that the subsequent recovery be minimized.

BRIEF SUMMARY OF THE INVENTION

The invention is an improvement in a reader of RFID tags having an input stage comprising a coil and a first and second channel coupled in parallel to each other between the coil and the input stage of the reader. The first and second channels are characterized by a response and recovery time to signals coupled thereto from the coil. The response and recovery time of the second channel is slower than the response and recovery time of the first channel. The first and second channels each have a node monitored by the input stage. A clamping device is coupled between the first and second channels to clamp signal levels on the monitored node of first and second channels close to each other so that recovery time of the first channel or node is reduced.

The clamping device is a diode, and preferably a Schottky diode. The clamping device clamps the first and second channels to within approximately 0.2 volt of each other.

The reader has a ground and first and second channels have a capacitance coupled between the coil and ground. The capacitance of the first channel is less than the capacitance of the second channel, and is preferably at least 1000 times less than the capacitance of the second channel.

The input stage is a differential amplifier having two differential inputs and the first and second channels are coupled to the two differential inputs. The clamping device couples the monitored nodes of the first and second channel and the monitored nodes are coupled to the two differential inputs.

The invention also comprises a method of operation of the above described circuit. The invention can be better visualized by turning to the following drawings.

The invention and its various embodiments having now been depicted in the foregoing drawings can be better understood by turning to the following detailed description of the preferred embodiments.

DETAILED DESCRIPTION OF THE PREFERRED EMBODIMENTS

The invention reduces recovery time in a receiving channel of an RFID reader by generating a reference voltage that then clamps the node on which the desired signal is monitored. The coil is coupled to parallel channels. One channel has a recovery time or capacitance very much less than the other parallel channel. The two channels have a monitored node which are clamped together or at least close together by means of a Schottky diode. The monitored nodes of both channels are coupled to the inputs of a differential amplifier. The output of the amplifier is the conditioned received signal from the coil used in the reader as the sensed signals from the RFID tags.

Figure 1:
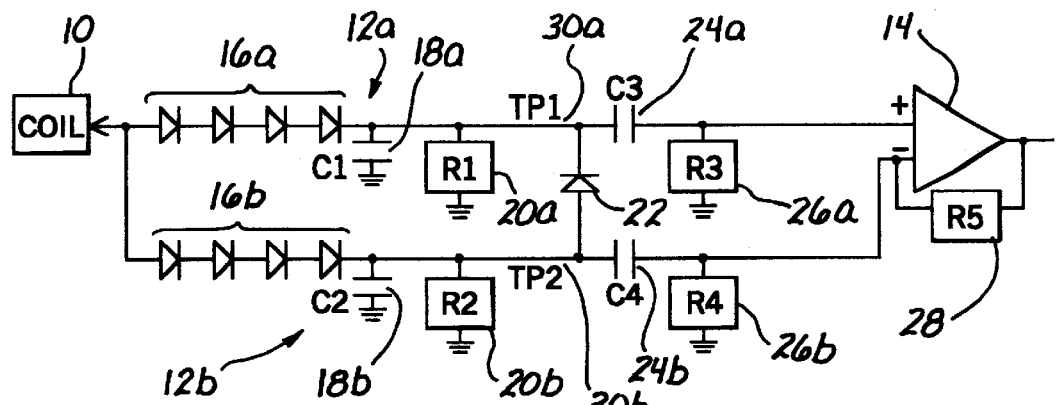
FIG. 1 is a schematic of the circuitry between a receiver coil of an RFID reader and the first amplification stage.

The method described reduces the recovery time in a receiving channel of an RFID reader by generating a reference voltage that then clamps the node on which the desired signal is monitored. FIG. 1 is a schematic of the antenna or coil portion of an RFID tag reader which includes a coil 10. Coil 10 is coupled to two parallel channels 12a and 12b which are coupled to the inputs of a differential operational amplifier 14, which represents the first amplification or input stage of the reader. Operational amplifier 14 is coupled to the reminding circuitry in the RFID reader, which is conventional and is thus not shown.

Channels 12a and 12b have identical topologies, although the circuit values differ in certain elements as will be discussed below. Channels 12a and 12b each have a diode chain 16a and 16b respectively coupled to coil 10. Capacitors 18a and 18b are coupled between ground and the output of diode chains 16a and 16b respectively. Coupled in parallel to capacitors 18a and 18b are resistors 20a and 20b coupled between ground and the output of diode chains 16a and 16b respectively. A diode 22 is also coupled between the output of diode chains 16a and 16b. Coupling capacitors 24a and 24b are coupled in series between the output of diode chains 16a and 16b respectively and the inputs to amplifier 14. Finally, resistors 26a and 26b are coupled between the inputs to amplifier 14 and ground. A feedback resistor 28 is provided between the negative input and output of amplifier 14.

In the illustrated embodiment the elements of FIG. 1 have the values:

C1 12a=1 pF
C2 12b=1000 pF
C3 24a, C4 24b=20 pF
R1 20a, R2 20b=20 Mohms
R3 26a, R4 26b=15 Kohms
R5 28=150 Kohms All the elements have identical values in channels 12a and 12b except for capacitors 18a and 18b where there is a 1000 fold difference. The coil voltage is typically 100 to 1000 volts peak-to-peak and is modulated to 0 volts for 2 to 4 $\mu s$ typically. Resistor 28 and capacitor 18b are selected so that the voltage on test point 30b, TP2, is sustained at a voltage just four diode drops below the positive voltage of coil 10. For example, if the peak-to-peak voltage on coil 10 is 200 volts, the voltage on test point 30b would be approximately 97.2 volts. With a time constant of 20 msec, the voltage on test point 30b would drop only a fraction of a volt during a typical 2 µs time period that the voltage on the coil falls to 0 volts. The time constant on test point 30a, TP1, is 20 µS and its voltage would fall by perhaps 10 volts, or approximately 1000 times the amount of test point 30b. However, Schottky diode 22 strapping test points 30a and 30b together will only allow test point 30a to drop 0.2 volts below test point 30b. A Schottky diode is preferred to a PN junction diode, since the voltage drop across the diode will be only 0.2 volts rather than 0.7 volts. When the power is again applied to coil 10, the voltage on test point 30a needs only recover the 0.2 volts instead of 10 volts or more. In addition, the increase in test points 30a and 30b during the recovery of the coil will track each other. These signals can then be capacitively coupled into operational amplifier 14 that amplifies the difference between the two signals. The much shorter time constant on test point 30a is required in order that the reflected (or inductively coupled) signal from a tag will cause a voltage variation on test point 30a and amplified by the subsequent operational amplifiers.

Figure 2:
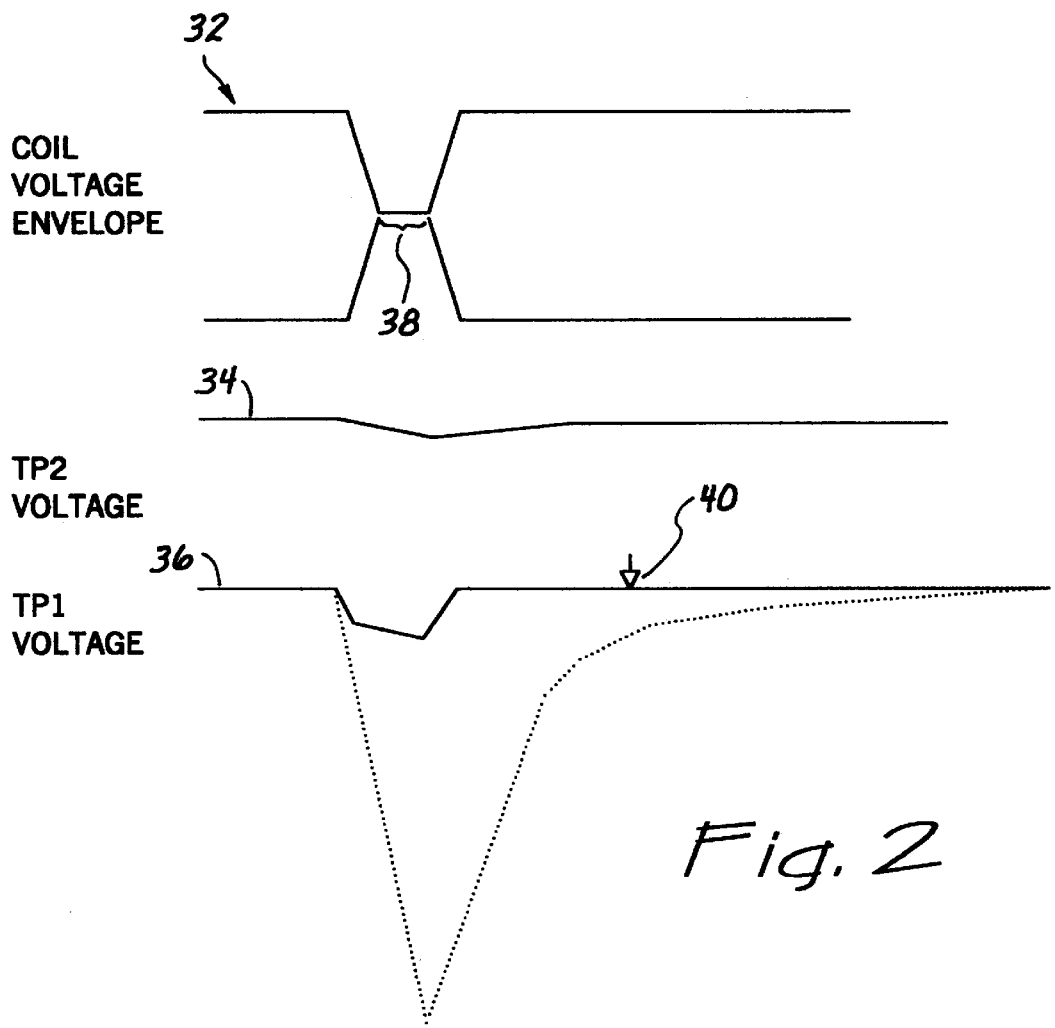
FIG. 2 is a waveform diagram of certain nodes of the circuit of FIG. 1.

It is important to recognize the levels of voltage at the various nodes. While coil 10 has hundreds of volts, the signal that is sensed from a tag will be only a few millivolts which makes it imperative that the change in the voltage on test point 30a during the settling time be quite small. In FIG. 2 are time plots of typical voltages at the various nodes. Line 32 is a graph of the voltage on coil 10 as a function of time. Coil 10 is at ±100 volts and is modulated to about 0 volts. The voltage of test point 30b is illustrated as a function of time by line 34, while the voltage of test point 30a is illustrated as a function of time by line 36. Both test point 30a and 30b start in FIG. 2 at about 97.2 volts and decrease to 96.8 and 97.0 volts respectively. The voltage decrease of test point 30a is much more rapid as well as being deeper. The return to 97.2 volts is also much more rapid for test point 30a than test point 30b. The dotted outline shows what the voltage drop in test point 30a would have been if diode 22 did not strap test point 30a and test point 30b together. The pulse width 38 in FIG. 2 is 1–2 µs. At time 40 when the return the signal is to be sensed, the voltage is still rapidly changing on test point 30a if the clamping diode 22 were not in place. This would make it impossible to sense a signal of only a few millivolts and of a few ps in duration. Although the voltage on test point 30b is fairly flat during this time, its time constant is so long that it essentially filters out the signal to be sensed.

Test point 30b acts as a voltage reference to which test point 30a is clamped during the time that the power is removed from coil 10. It is this dual reference and clamping that allows for the highly sensitive receiving of a very small signal.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

For example, although specific circuit values have been discussed and shown for various elements, it is expressly to be understood that many other values could be chosen without departing from the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An improvement in a reader of RFID tags having an input stage comprising:
    a coil;
    a first and second channel coupled in parallel to each other between said coil and said input stage of said reader, said first and second channels characterized by a response and recovery time to signals coupled thereto from said coil, said response and recovery time of said second channel being slower than said response and recovery time of said first channel, said first and second channels each having a node monitored by said input stage; and
    a clamping device coupled between said first and second channels to clamp signal levels on said monitored node of first and second channels close to each other so that recovery time of said node is reduced.

2. The improvement of claim 1 wherein said clamping device is a diode.

3. The improvement of claim 1 wherein said clamping device is a Schoftky diode.

4. The improvement of claim 1 wherein said clamping device clamps said first and second channels two within approximately 0.2 volt of each other.

5. The improvement of claim 1 wherein said reader has a ground and wherein first and second channels have a capacitance coupled between said coil and ground, said capacitance of said first channel being less than said capacitance of said second channel.

6. The improvement of claim 5 wherein said capacitance of said first channel is at least 1000 times less than said capacitance of said second channel.

7. The improvement of claim 1 wherein said input stage is a differential amplifier having two differential inputs and wherein said first and second channels are coupled to said two differential inputs.

8. The improvement of claim 1 wherein said input stage is a differential amplifier having two differential inputs and wherein said clamping device couples said monitored nodes of said first and second channel and where said monitored nodes are coupled to said two differential inputs.

9. The improvement of claim 8 wherein said clamping device clamps said first and second channels two within approximately 0.2 volt of each other.

10. The improvement of claim 8 wherein said clamping device is a Schottky diode.

11. A method of processing signals in a receiver of a reader of RFID tags, said reader having an input stage comprising:

receiving signals from one of said RFID tags by use of a coil;

coupling said received signal from said coil to a first and second channel coupled in parallel to each other between said coil and said input stage of said reader, said first and second channels characterized by a response and recovery time to signals coupled thereto from said coil, said response and recovery time of said second channel being slower than said response and recovery time of said first channel, said first and second channels each having a node monitored by said input stage; and clamping said monitored node of first and second channels close to each other so that recovery time of said node is reduced.

12. The method of claim 11 wherein clamping said monitored node of first and second channels comprises clamping said monitored nodes by means of a diode.

13. The method of claim 11 wherein clamping said monitored node of first and second channels comprises clamping said monitored nodes by means of a Schottky diode.

14. The method of claim 11 wherein clamping said monitored node of first and second channels comprises clamping said monitored nodes within approximately 0.2 volt of each other.

15. The method of claim 11 further comprising providing said reader has a ground and coupling said first and second channels between said coil and ground with a capacitance, said capacitance of said first channel being less than said capacitance of said second channel.

16. The method of claim 15 wherein coupling said first and second channels between said coil and ground couples said coil and ground in said first channel with a capacitance at least 1000 times less than said capacitance of said second channel.

17. The method of claim 11 wherein said input stage is a differential amplifier having two differential inputs and wherein coupling said received signal through said first and second channel to said input stage couples said first and second channels to said two differential inputs.

18. The method of claim 11 wherein said input stage is a differential amplifier having two differential inputs, wherein clamping said monitored node of first and second channels couples said monitored nodes to said two differential inputs.

19. The method of claim 18 wherein clamping said monitored node of first and second channels clamps said first and second channels within approximately 0.2 volt of each other.

20. The method of claim 18 wherein clamping said monitored nodes of first and second channels clamps said monitored nodes by means of a Schottky diode.

\* \* \* \* \*